US008343354B2

(12) United States Patent
Cousins

(10) Patent No.: US 8,343,354 B2
(45) Date of Patent: *Jan. 1, 2013

(54) SULPHUR REMOVAL

(75) Inventor: Matthew John Cousins, Darlington (GB)

(73) Assignee: Johnson Matthey PLC, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/448,654

(22) Filed: Apr. 17, 2012

(65) Prior Publication Data

US 2012/0199538 A1 Aug. 9, 2012

Related U.S. Application Data

(63) Continuation of application No. 12/377,512, filed as application No. PCT/GB2007/050491 on Aug. 14, 2007, now Pat. No. 8,177,983.

(30) Foreign Application Priority Data

Aug. 17, 2006 (GB) .................................. 0616343.0

(51) Int. Cl.
*C02F 1/42* (2006.01)
*B01J 20/00* (2006.01)

(52) U.S. Cl. ......... 210/688; 210/683; 502/407; 502/414

(58) Field of Classification Search .................. 210/688, 210/914, 502.1, 683; 502/400, 63, 80, 406
See application file for complete search history.

(56) References Cited

U.S. PATENT DOCUMENTS

| | | | |
|---|---|---|---|
| 2,665,259 A | 1/1954 | Buffett | |
| 3,143,410 A | 8/1964 | Smith | |
| 4,094,777 A | 6/1978 | Sugier et al. | |
| 4,909,926 A | 3/1990 | Yan | |
| 4,996,181 A | 2/1991 | Denny et al. | |
| 5,053,209 A | 10/1991 | Yan | |
| 5,245,106 A | 9/1993 | Cameron et al. | |
| 5,350,728 A | 9/1994 | Cameron et al. | |
| 6,221,241 B1 | 4/2001 | Carnell et al. | |
| 6,444,601 B1 | 9/2002 | Purcell, Jr. et al. | |
| 8,177,983 B2 * | 5/2012 | Cousins | 210/688 |
| 2003/0091851 A1 | 5/2003 | Khor et al. | |
| 2006/0148642 A1 | 7/2006 | Ryu et al. | |
| 2010/0230361 A1 * | 9/2010 | Cousins | 210/688 |
| 2010/0320153 A1 * | 12/2010 | Cousins et al. | 210/688 |

FOREIGN PATENT DOCUMENTS

| | | |
|---|---|---|
| EP | 0 480 603 A2 | 4/1992 |
| EP | 0 484 233 B1 | 5/1992 |
| EP | 0 487 370 A1 | 5/1992 |
| EP | 0 628 337 B1 | 12/1994 |
| GB | 1 533 059 | 11/1978 |
| WO | WO-2005/047438 A1 | 5/2005 |

OTHER PUBLICATIONS

Huang et al., "Amine-Grafted MCM-48 and Silica Xerogel as Superior Sorbents for Acidic Gas Removal from Natural Gas," *Ind. Eng. Chem. Res.* 2003, 42, 2427-2433.
International Preliminary Report on Patentability dated Feb. 17, 2009, from PCT International Application No. PCT/GB2007/050491.

\* cited by examiner

*Primary Examiner* — Christopher Upton
*Assistant Examiner* — Nader Hossaini
(74) *Attorney, Agent, or Firm* — RatnerPrestia

(57) ABSTRACT

A process for desulfurizing a process fluid includes contacting a sulphur compound containing feed stream with an absorbent including an iron, copper or nickel compound capable of forming a metal sulphide, a support material, a first binder and a second binder where the first binder is a cement binder and the second binder is a high aspect ratio aluminosilicate clay binder having an aspect ratio >2 and a ratio of the first binder to the second binder is in the range 2:1 to 3:1.

5 Claims, No Drawings

SULPHUR REMOVAL

CROSS-REFERENCE TO RELATED APPLICATIONS

This application is a continuation application of U.S. patent application Ser. No. 12/377,512, filed Feb. 13, 2009, which is a U.S. National Phase application of PCT International Application No. PCT/GB2007/050491, filed Aug. 14, 2007, and claims priority of British Patent Application No. 0616343.0, filed Aug. 17, 2006, the disclosures of all of which are incorporated herein by reference in their entireties for all purposes.

FIELD OF THE INVENTION

This invention relates to mercury absorbents and to a process for the removal of mercury from a gaseous or liquid stream using said absorbents. This invention also relates to a process for the removal of sulphur.

BACKGROUND OF THE INVENTION

GB-B-1533059 discloses the use of a pre-sulphided absorbent comprising copper sulphide for the absorption of mercury from a natural gas stream containing mercury. The pre-sulphided absorbent is prepared by forming a precursor comprising basic copper carbonate and a refractory cement binder, and then contacting the precursor with a gaseous stream containing a sulphur compound, e.g. hydrogen sulphide, so as to fully sulphide the copper compound. The pre-sulphided absorbent is then used to remove mercury from a natural gas stream. It is also shown that an absorbent comprising copper in the reduced, i.e. metallic, state is less effective at absorbing mercury than the pre-sulphided absorbent.

EP 0480603 describes a process for the removal of mercury from a stream wherein an absorbent comprising a metal sulphide is prepared in situ, preferably by the stream also containing a sulphur compound thereby concomitantly preparing the mercury absorbent and absorbing the mercury, such that the formation of ineffective and undesired metal compounds e.g. sulphates is avoided.

Such materials, especially those described in GB-1533059, undergo considerable physiochemical changes upon treatment with sulphur compounds to form the metal sulphide phases known to be effective for mercury removal. The physiochemical changes result in reduced crush strength and an increased susceptibility to attrition, particularly with high metal sulphide containing materials. It is therefore desirable to increase the crush strength whilst maintaining attrition resistance. We have found that a combination of binders and support material in the absorbent overcomes the problems associated with prior art materials.

SUMMARY OF THE INVENTION

Accordingly the invention provides a particulate mercury absorbent comprising a metal sulphide, a support material, a first binder and a second binder wherein said first binder is a cement binder and the second binder is a high aspect ratio binder having an aspect ratio >2.

The invention further provides a mercury removal process comprising contacting a mercury-containing feed stream with a particulate mercury absorbent comprising a metal sulphide, a support material, a first binder and a second binder wherein said first binder is a cement binder and the second binder is a high aspect ratio binder having an aspect ratio >2.

The invention further provides a process for desulfurizing a process fluid comprising contacting a sulphur compound containing feed stream with an absorbent comprising an iron, copper or nickel compound capable of forming a metal sulphide, a support material, a first binder and a second binder, wherein said first binder is a cement binder and the second binder is a high aspect ratio aluminosilicate clay binder having an aspect ratio >2 and wherein a ratio of the first binder to the second binder is in the range 2:1 to 3:1.

DETAILED DESCRIPTION OF THE INVENTION

The absorbent may be sulphided ex-situ or sulphided in-situ according to known methods. Hence the invention includes a particulate mercury absorbent precursor comprising a metal compound capable of forming the metal sulphide, a support material, a first cement binder and a second high aspect ratio binder, that may be treated with sulphur compounds to form the metal sulphide and a mercury removal process comprising contacting a mercury-containing feed stream with a particulate mercury absorbent comprising a metal sulphide capable of absorbing mercury, wherein the absorbent is formed by contacting in-situ a particulate precursor comprising a metal compound capable of forming the metal sulphide, a support material, the first binder and the second binder with a stream containing a sulphur compound.

Whereas the precursor may be sulphided using a stream which contains a suitable sulphur compound to form the absorbent and then held in-situ in a non-oxidising environment, it is preferred, where the absorbent is not pre-sulphided, that the sulphiding of the precursor and the absorption of mercury occur together, i.e. they are concomitant, thereby avoiding the need for a separate sulphiding process and the subsequent storage difficulties. Hence in a preferred embodiment the feed stream and the first stream are the same and the present invention may be advantageously used on streams that contain both mercury and sulphur compounds.

The present invention may be used to treat both liquid and gaseous feed streams containing mercury. In a preferred process of the invention the fluid is a hydrocarbon stream. The hydrocarbon stream may be a refinery hydrocarbon stream such as naphtha (e.g. containing hydrocarbons having 5 or more carbon atoms and a final atmospheric pressure boiling point of up to 204° C.), middle distillate or atmospheric gas oil (e.g. having an atmospheric pressure boiling point range of 177° C. to 343° C.), vacuum gas oil (e.g. atmospheric pressure boiling point range 343° C. to 566° C.), or residuum (atmospheric pressure boiling point above 566° C.), or a hydrocarbon stream produced from such a feedstock by e.g. catalytic reforming. Refinery hydrocarbon steams also include carrier streams such as "cycle oil" as used in FCC processes and hydrocarbons used in solvent extraction. The hydrocarbon stream may also be a crude oil stream, particularly when the crude oil is relatively light, or a synthetic crude stream as produced from tar oil or coal extraction for example. The fluid may be a condensate such as natural gas liquid (NGL) or liquefied petroleum gas (LPG). Gaseous hydrocarbons may be treated using the process of the invention, e.g. natural gas or refined paraffins or olefins, for example.

Non-hydrocarbon fluids which may be treated using the process of the invention include solvents, such as liquid $CO_2$, used in extractive processes for enhanced oil recovery or decaffeination of coffee, flavour and fragrance extraction, solvent extraction of coal etc. Fluids, such as alcohols (including glycols) and ethers used in wash processes or drying processes (e.g. triethylene glycol, monoethylene glycol, Rectisol™, Purisol™ and methanol) may be treated by the inventive process. Natural oils and fats such as vegetable and fish oils may be treated by the process of the invention, optionally after further processing such as hydrogenation or transesterification e.g. to form biodiesel.

Gaseous feed streams which are susceptible to being treated by absorbents comprising metal sulphide precursors may also include those which inherently contain both mercury and a sulphur compound e.g. certain natural gas streams, or a mercury containing gaseous stream to which a sulphur compound has been added to effect mercury absorption. Suitable liquid streams include mercury containing LPG and naphtha streams. Other fluid streams that may be treated include mercury-containing nitrogen, argon, helium and carbon dioxide.

Preferably the absorption of mercury is conducted at a temperature below 100° C. in that at such temperatures the overall capacity for mercury absorption is increased. Temperatures as low as 4° C. may be used to good effect in the present invention.

The mercury may be in the form of mercury vapour, organomercuric, or organomercurous compounds. Typically the concentration of mercury in a gaseous feed stream is from 0.01 to 1000 $\mu g/Nm^3$, and more usually between 10 to 200 $\mu g/Nm^3$.

The absorbent may usefully be prepared by combining a metal compound capable of forming a metal sulphide with the support material and the first and second binders in the presence of a little water to form a particulate precursor which is then dried and sulphided. As stated above, the sulphiding step may be performed on the dried material ex-situ to provide the final absorbent, or may be performed in situ, in which case the particulate precursor is installed and undergoes sulphidation in the vessel in which it is used to absorb mercury compounds.

The sulphur compound used to sulphide the precursor may be one or more sulphur compounds such as hydrogen sulphide, carbonyl sulphide, mercaptans and polysulphides. Hydrogen sulphide is preferred.

Where concomitant sulphiding and mercury absorption occurs, the amount of sulphur compound that is present depends on the type of sulphur compound and metal compound used. Usually, a concentration ratio, as defined by the ratio of sulphur compound (expressed as hydrogen sulphide) concentration (v/v) to mercury concentration (v/v), of at least one, and preferably of at least 10 is used so that the precursor is sufficiently sulphided. Should the initial concentration of the sulphur compound in the feed stream be below the level necessary to establish the desired ratio of sulphur compound to mercury compound concentration then it is preferred that the concentration of the sulphur compound is increased by any suitable method.

The metal sulphide is desirably one with a high capacity for mercury. One or more metal sulphides may be present. The metal may be any which provides a metal compound which shows a suitable capacity for being sulphided and hence for mercury absorption. Examples of suitable metals are iron, nickel and copper, preferably copper and nickel and in particular copper. Certain other metals, however, are generally unable to provide either compounds which can be suitably sulphided, e.g. aluminium, or sulphided compounds which can adequately absorb mercury. Nevertheless, a compound of such an other metal may be present as a binding or support agent, which improves the structural integrity of the absorbent, and/or as a promoter which enhances the sulphiding of the precursor and/or the absorption of mercury by the absorbent.

A preferred absorbent composition comprises copper and zinc. Copper and zinc compounds may be added separately to the support and binders to prepare the absorbent precursor. Alternatively, a single copper-zinc composition may be used. A support material such as alumina may also be present in such a composition.

Upon treatment with sulphur compounds the metal compounds in the absorbent precursor react to form metal sulphides. CuS is a particularly preferred metal sulphide. Absorbents used in the present invention preferably comprise copper in an amount 1-40% wt, preferably 1-20% wt, more preferably 5-15% wt Cu (based upon the sulphided composition).

The metal compound suitable for use in an absorbent precursor is one that may be readily sulphided and may include the oxide, carbonate, bicarbonate and/or basic carbonate. A particularly suitable absorbent precursor comprises basic copper carbonate (i.e. a copper hydroxycarbonate).

Support materials are desirably oxide materials such as aluminas, titanias, zirconias, silicas and aluminosilicates. Hydrated oxides may also be used, for example alumina trihydrate. Preferred supports are transition aluminas such as gamma, theta and delta alumina. The support may be present in an amount 50-90% wt, preferably 70-80% wt (based upon on the sulphided composition). By using the first and second binders we have found that the amount of support material may be increased compared to prior art materials without sacrificing rate of mercury absorption, strength or attrition resistance.

In the present invention, the metal sulphide or precursor is combined with a support, a first binder and a second binder. The first binder is preferably a cement binder, in particular a calcium aluminate cement. By the term calcium aluminate cement we include such calcium aluminate compounds as calcium monoaluminate ($CaO.Al_2O_3$), tricalcium aluminate ($3CaO.Al_2O_3$), pentacalcium trialuminate ($5CaO.3Al_2O_3$), tricalcium penta aluminate ($3CaO.5Al_2O_3$), dodeca calcium hepta aluminate ($12CaO.7Al_2O_3$) and high alumina cements which may contain alumina in admixture with, dissolved in, or combined with such calcium aluminate compounds. For example, a well-known commercial cement has a composition corresponding to about 18% wt calcium oxide, 79% wt alumina and 3% wt water and other oxides. Another suitable commercially available calcium aluminate cement has a composition corresponding to about 40% wt calcium oxide, about 37% wt alumina, about 6% wt silica and about 20% other oxides. The second binder is preferably a high aspect ratio binder having an aspect ratio >2. By the term high aspect ratio we mean that the ratio between the maximum dimension and the minimum dimension of the particles is >2. The particles may thus be plate-like where the length and breadth are at least twice the thickness. Alternatively, and preferably, the particles are acicular, wherein the average length is at least twice, preferably at least 2.5 times, the breadth, e.g. having a "rod" configuration wherein the cross sectional dimensions, i.e. breadth and thickness are approximately equal, or a "lath" configuration, wherein the thickness is significantly less than the breadth. A suitable high aspect ratio binder is an aluminosilicate clay, preferably an aluminium-magnesium silicate clay, commonly referred to as an Attapulgite clay. Without wishing to be bound by theory, we believe that the acicular nature of this binder comprising elongate particles with an aspect ratio >2 contributes to the improved physical properties of the absorbent materials according to the present invention. We have found surprisingly that the combination of these two types of binder in combination with the metal sulphide and support are capable of providing absorbent materials of high crush strength and low attrition, as well as suitably high rate of mercury absorption. The amount of the first binder may be in the range 5 to 15% by weight based on the un-sulphided absorbent precursor. The amount of the second binder may be in the range 1 to 10%, preferably 2 to 6% by weight on the un-sulphided absorbent precursor. Preferably, the relative amounts of the binders are 2:1 to 3:1 first to second binder.

The absorbent comprising the sulphided metal compound may be in any suitable physical form, e.g. as a granule, extrudate, or tablet so that the mercury-containing stream may be contacted with a bed of solid absorbent particles. Particularly effective absorbents are those prepared from precursors containing unsulphided metal compounds having a capacity to be highly sulphided. It is preferred that the amount of unsulphided metal compound present is such that the precursor may be sulphided to achieve a sulphur loading of at least 0.5% w/w, e.g. from 1-10% wt sulphur, although higher loadings of sulphur may be provided.

The absorbent precursor may be in the form of tablets formed by moulding a suitable powder composition, generally containing a material such as graphite or magnesium stearate as a moulding aid, in suitably sized moulds, e.g. as in conventional tableting operation. Alternatively, the shaped units may be in the form of extruded pellets formed by forcing a suitable composition, containing the absorbent precursor material and often a little water and/or a moulding aid as indicated above, through a die followed by cutting the material emerging from the die into short lengths. For example extruded pellets may be made using a pellet mill of the type used for pelleting animal feedstuffs, wherein the mixture to be pelleted is charged to a rotating perforate cylinder through the perforations of which the mixture is forced by a bar or roller within the cylinder: the resulting extruded mixture is cut from the surface of the rotating cylinder by a doctor knife positioned to give extruded pellets of the desired length. Alternatively, and preferably, the absorbent or absorbent precursor may be in the form of agglomerates formed by mixing the absorbent precursor material with a little water, insufficient to form a slurry, and then causing the composition to agglomerate into roughly spherical, but generally irregular, granules.

If desired the absorbent or absorbent precursors may be heated or treated in another way to accelerate the setting of the cement binder.

The different shaping methods have an effect on the surface area, porosity and pore structure within the shaped articles and in turn this often has a significant effect on the absorption characteristics and on the bulk density.

The absorbent preferably has an average particle size within the range 1-10 mm.

EXAMPLES

The invention is further described by reference to the following Examples.

In all cases, absorbent precursor particles were prepared using a granulation technique wherein the solid components were combined with a little water and mixed to form granules in a Hobart mixer. A copper-zinc composition comprising basic copper carbonate and containing 60% wt copper, and 25% wt zinc (expressed as oxides) and about 15% wt alumina was used. Alumina trihydrate (ATH) was used as the support material unless otherwise stated. Binders were added to these two components, sometimes as a mix of two binders to produce the desired affect. Binder 1 in each case was a calcium aluminate cement having a CaO content of about 40% wt. Binder 2 in each case was an Attapulgite clay. The granules were dried prior to sulphiding. Unless otherwise stated, drying was performed at 105° C. in air for 16 hours after a period of 2 hours at ambient temperature (ca 20° C.). The size range of granules obtained was 2.80-4.75 mm.

To assess the performance of each of the materials screened, the physical properties of the 2.80-4.75 mm material were measured before the sulphiding step. Mean Crush Strength (MCS), Tapped Bulk Density (TBD) and attrition resistance of the precursor were measured. The MCS and attrition of the materials were also tested after each of the materials was sulphided using $H_2S$.

Mean Crush Strength (MCS): This analysis was carried out using a CT5 crush strength tester fitted with a 50 Kg load cell. The granules selected for testing were sized from 3.35-4.00 mm taken from the 2.80-4.75 mm bulk sample, this would reduce any effect of the granule size on strength. 30 granules were chosen at random from the 3.35-4.00 mm size range and tested. The average of these results was taken to be the resultant value. The standard deviation was also recorded as a measure of the variability within the sample.

Tapped Bulk Density (TBD): This was carried using a 100 ml measuring cylinder into which was poured approximately 60 ml of the test material then the cylinder was manually tapped to achieve a constant volume. At this point the mass of the materials and the volume it held were recorded.

Attrition Testing: Attrition testing was carried out using the 'tube method'. In the tube method, a 50 ml of sample of the sulphided absorbent was weighed accurately into a 37 mm id tube of length 25 cm. Following a 45-minute tumbling period, the sample was reweighed after the removal of the <1.00 mm fraction by sieving. The % weight loss owing to attrition was calculated based on the weight <1.0 mm and the total weight of material at the start of the test. The tumbling period of 45 minutes subjected the sample to 3600 falls.

Sulphiding of Materials: The precursor materials were taken to a fully sulphided state using 1% $H_2S$ in an inert carrier gas, (typically $N_2$ or $CH_4$). In all cases the flow rate of the gas was 42 liters $hr^{-1}$ at ambient temperature and pressure.

Example 1

Samples were prepared with the following compositions (all amounts are parts weight).

| Example | Cu/Zn composition | ATH | Binder 1 | Binder 2 |
|---|---|---|---|---|
| Comparative 1 | 100 | 0 | 7 | 0 |
| Comparative 2 | 25 | 75 | 14 | 0 |
| Comparative 3 | 25 | 75 | 0 | 14 |
| 1(a) | 25 | 75 | 7 | 7 |

Results: Before Sulphiding

| Example | MCS (Kg) | TBD (Kg/m³) | Attrition loss (% wt) |
|---|---|---|---|
| Comparative 1 | 1.28 | 0.77 | 1.4 |
| Comparative 2 | 2.81 | 1.06 | 4.6 |
| Comparative 3 | 1.42 | 0.92 | 0.6 |
| 1(a) | 1.94 | 0.945 | 0.42 |

Results: After Sulphiding

| Example | Sulphur (wt %) | MCS (Kg) | TBD (Kg/m³) | Attrition loss (% wt) |
|---|---|---|---|---|
| Comparative 1 | 21.1 | 1.13 | 0.76 | 0.8 |
| Comparative 2 | 2.9 | 2.66 | 1.06 | 4.8 |
| Comparative 3 | 4.8 | 1.03 | 0.88 | 0.2 |
| 1(a) | 3.64 | 1.68 | 0.92 | 0.6 |

From the combination of properties Example 1(a) shows high MCS and TBD and low attrition pre and post sulphiding. The Comparative Example 2 has a high crush strength but a very poor attrition resistance (i.e. a high attrition loss).

Example 2

In this example, further variations of the binder ratio were studied together with the use of hot (55° C.) and cold (ca 15° C.) water during the granulation process.

| Example | Treatment | Cu/Zn composition | ATH | Binder 1 | Binder 2 |
|---|---|---|---|---|---|
| 2(a) | Cold water | 25 | 75 | 10 | 4 |
| 2(b) | Hot water | 25 | 75 | 10 | 4 |
| Comparative | Hot water | 25 | 75 | 14 | 0 |

Results

| Example | MCS (Kg) (Unsulphided) | MCS (Kg) (Sulphided) | Attrition (% wt) (Sulphided) |
|---|---|---|---|
| 2(a) | 2.40 | 2.36 | 0.76 |
| 2(b) | 2.37 | 2.52 | 2.13 |
| Comparative | 3.06 | 2.98 | 5.17 |

The results show that by using the combination of first and second binders that the attrition losses are reduced markedly over the single binder sample. The use of hot or cold water does not appear to have had a significant effect.

Example 3

A further variation, studied was to increase the copper level from the 25% level in the above formulations to 50%.

| Example | Cu/Zn composition | ATH | Binder 1 | Binder 2 |
|---|---|---|---|---|
| 3(a) | 50 | 50 | 10 | 4 |

Result

| Example | MCS (Kg) (Unsulphided) | MCS (Kg) (Sulphided) | Attrition (% wt) (Sulphided) |
|---|---|---|---|
| 3(a) | 1.87 | 1.42 | 1.37 |

Example 4

Mercury Pickup Tests

Those formulations selected for study were;
1) Example 2(a).
2) Example 3(a).
3) A comparative Example (Example 1 Comparative 3), containing only Binder 2.

The materials were prepared for testing by crushing a portion of the 2.8-4.75 mm precursor granules to grain size 1.0-2.0 mm, then fully sulphiding in 1.0% of $H_2S$ in nitrogen at 42 liters/hr. Following the sulphiding stage, the $H_2S$ was purged from the reactor. The testing was carried out using a 25 ml charge of the above prepared absorbents, at LHSV=7.0 hr−1, using n-hexane saturated with elemental mercury to ca. 1.0 ppm w/v for a total run period of 750 hours unless otherwise stated. This would allow comparison with standard runs carried out previously. During the test period, the reactor effluent was occasionally sampled and analysed for mercury slippage.

At the end of the test period, the beds were dried using a gentle flow of nitrogen, and removed from the reactor as 9 discrete sub-beds using a vacuum method. Each of the sub-beds was analysed for total mercury, using an ICP-atomic emission spectroscopic technique, to allow the mercury profile to be determined. A further check was made, calculating the average mercury concentration inlet the reactor during the run. From the analysis of the mercury level on each weighed sub-bed, the weight of mercury was calculated on each, and the summation gave the total weight of mercury passed through the bed during the run. Knowing the total number of hours the run had lasted and the hexane flow rate in ml/hr, then the average [Hg] inlet the bed in ppb of Hg (w/v) would be;

$$\frac{\text{weight of } Hg \text{ on beds (g)}}{hrs \text{ on line} \times \text{flow rate (ml}/hr)} = ppb \, Hg$$

The results were as follows;

| | Total Mercury on Discharged Sub-beds (ppm w/w) | | |
|---|---|---|---|
| | Example 1 Comparative 3 | Example 2(a) | Example 3(a) |
| 1 Exit | Nil | Nil | Nil |
| 2 | Nil | Nil | Nil |
| 3 | Nil | Nil | Nil |
| 4 | Nil | 10 | Nil |
| 5 | 17 | 92 | Nil |
| 6 | 76 | 810 | 35 |
| 7 | 1635 | 6250 | 440 |
| 8 | 17040 | 1900 | 10000 |
| 9 Inlet | 47800 | 36200 | 45300 |
| Calculated Inlet [Hg] ppb (w/v) | 1230 | 986 | 929 |

What is claimed is:

1. A process for desulfurizing a process fluid comprising contacting a sulphur compound containing feed stream with an absorbent comprising an iron, copper or nickel compound capable of forming a metal sulphide, a support material, a first binder and a second binder, wherein said first binder is a cement binder and the second binder is a high aspect ratio aluminosilicate clay binder having an aspect ratio >2 and wherein a ratio of the first binder to the second binder is in the range 2:1 to 3:1.

2. A process according to claim 1 wherein the support material is an alumina or hydrated alumina.

3. A process according to claim 1 wherein the first binder is a calcium aluminate cement binder.

4. A process according to claim 1 wherein the second binder is an Attapulgite clay.

5. A process according to claim 1 wherein the absorbent is formed by combining the iron, copper or nickel compound, the support material, the first binder and the second binder in the presence of water in a granulator.

* * * * *